(12) United States Patent
Jørgensen et al.

(10) Patent No.: US 8,871,100 B2
(45) Date of Patent: Oct. 28, 2014

(54) ROTATING STRAINER

(75) Inventors: Michael Franklin Jørgensen, Sønder Felding (DK); Klaus Pedersen, Silkeborg (DK)

(73) Assignee: SPX APV Denmark A/S, Silkeborg (DK)

( * ) Notice: Subject to any disclaimer, the term of this patent is extended or adjusted under 35 U.S.C. 154(b) by 119 days.

(21) Appl. No.: 13/341,153

(22) Filed: Dec. 30, 2011

(65) Prior Publication Data
US 2013/0171312 A1    Jul. 4, 2013

(51) Int. Cl.
| | | |
|---|---|---|
| B01D 33/06 | (2006.01) | |
| B01D 35/027 | (2006.01) | |
| B01D 33/00 | (2006.01) | |

(52) U.S. Cl.
CPC .......... *B01D 33/0009* (2013.01); *B01D 35/027* (2013.01)
USPC ........ 210/781; 210/784; 210/360.1; 210/402; 210/782; 426/478

(58) Field of Classification Search
CPC ............................ B01D 33/009; B01D 35/027
USPC .............. 210/781, 784, 360.1, 369, 391, 393, 210/394, 402, 403, 782; 426/478
See application file for complete search history.

(56) References Cited

U.S. PATENT DOCUMENTS

| | | | | |
|---|---|---|---|---|
| 1,650,434 A | * | 11/1927 | Daman ........................... | 210/210 |
| 2,633,993 A | * | 4/1953 | Biggar .......................... | 210/391 |
| 2,734,429 A | * | 2/1956 | Cook ............................ | 162/306 |
| 2,891,671 A | * | 6/1959 | Nilsson ......................... | 210/211 |
| 3,314,544 A | * | 4/1967 | Rosaen ....................... | 210/172.3 |
| 4,224,147 A | * | 9/1980 | Traut ............................ | 210/660 |

FOREIGN PATENT DOCUMENTS

| | | |
|---|---|---|
| EP | 2384802 | 11/2011 |
| FR | 2146532 | 3/1973 |
| FR | 2148732 | 3/1973 |
| JP | 56-37017 A * | 4/1981 |
| JP | 2002-263414 A * | 9/2002 |
| WO | WO9116961 | 11/1991 |
| WO | WO9929393 | 6/1999 |

* cited by examiner

*Primary Examiner* — Fred Prince
(74) *Attorney, Agent, or Firm* — Baker & Hostetler LLP

(57) ABSTRACT

Processing of a bulk liquid including particles, including use of a rotating strainer surface with openings disposed on a circumference thereof, the openings allowing an extracted liquid in the bulk liquid to pass through the strainer surface while preventing particles from passing through the strainer surface, such that a concentration of particles in the extracted liquid is less than in the bulk liquid; an extracted liquid outflow port which outputs the extracted liquid from an interior region of the rotating strainer surface; and a motor configured to rotate the strainer surface at a speed sufficient to generate a centrifugal force or turbulence at the openings sufficient to prevent the particles from clogging the openings, wherein the strainer surface is rotated and the extracted liquid is output through the extracted liquid outflow port when the strainer surface is fully submerged in the bulk liquid.

16 Claims, 3 Drawing Sheets

ROTATING STRAINER

TECHNICAL FIELD

This disclosure generally relates to a submerged rotating strainer device useful for extracting a liquid from a bulk liquid containing particles, where the device is self-cleaning while performing the extracting.

BACKGROUND

A curdmaking process is used to transform cheese milk into quality cheese curd with the highest possible yield. In use, this cheese vat is filled with cheese milk (optionally pre-acidified), and then caused to coagulate by addition of enzyme and acid, acid alone, or a composite coagulant to the cheese milk. Various types of cheese have respective production procedures. Once the cheese milk has coagulated to form a curd, it is important to handle the curd gently as it is still soft. A portion of whey is drained. As the whey is removed, the cheese mass turns harder. After whey is removed, the curd and remaining whey are then transferred for subsequent processing, such as processing over a slotted conveyor or such to further drain whey from the curd.

One issue in separating the curd and whey is that small curd particles that often leave the vat together with drained whey. This loss of curd can significantly reduce yield, and processing techniques have been developed which seek to reclaim these curd particles from the whey stream and reincorporate them into the cheese mass. Reductions in yield resulting from these curd particles can be reduced or avoided by continuously stirring the curd and whey while draining the whey. However, simple strainers, such as meshes, quickly become clogged with curd particles. U.S. Pat. No. 6,050,179, herein incorporated by reference in its entirety, describes a strainer disc device for draining whey while stirring the curd and whey. The disclosed strainer has a circularly shaped strainer disc rotatably arranged flat against a wall of a cheese vat. It is intended that the rotation of the strainer disc is sufficient to prevent the accumulation of curd particles and associated clogging of the strainer disc. Additionally, rotation of the agitator during stirring is also intended to help remove any curd particles which manage to adhere to the strainer disc by performing mechanical scraping of the strainer disc.

However, the inventors have recognized a number of issues with this strainer disc. First, the curd is extremely fragile in the beginning of the cheese-making process. Shear stress created by the rotating strainer disc damages the curd and crease small curd particles which escape through the strainer disc with the whey, which reduces yield. Second, limitations to the size of the disc limit the capacity of the strainer. Third, there are inconsistent flow characteristics on the surface of the strainer disc, which make it difficult to determine and maintain optimal settings for its operation from batch to batch or unit to unit.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

The subject matter described in this application, in comparison to the above-mentioned strainer disc, ensures gentler treatment of curd, improved production yield by reducing the generation of additional curd particles, greater flow capacity, and more consistent flow characteristics. In particular, embodiments of the disclosed subject matter demonstrate outstanding anti clogging performance when the rotated as prescribed. It has been observed, for example, that as soon as rotation of a strainer according to the disclosed subject matter is stopped, strainer flow capacity goes down to only 1% of the flow capacity observed during rotation. The disclosed subject matter is useful for cheese production in particular, but is also applicable more generally for extracting a liquid component from a bulk liquid containing particles.

In an embodiment of the disclosed subject matter, there is a device for processing a bulk liquid comprising particles, the particles in the bulk liquid being at a first concentration, and the device comprising: a rotating strainer surface with one or more openings disposed on a circumference thereof, the openings configured to allow an extracted liquid included in the bulk liquid to pass through the strainer surface while preventing particles from passing through the strainer surface, such that a concentration of particles in the extracted liquid is less than 10% of the first concentration; an extracted liquid outflow port which outputs the extracted liquid from an interior region of the rotating strainer surface; and a motor configured to rotate the strainer surface at a speed sufficient to generate a centrifugal force or turbulence at the openings sufficient to prevent the particles from clogging the openings, wherein the device is configured to rotate the strainer surface and output the extracted liquid through the extracted liquid outflow port when the strainer surface is fully submerged in the bulk liquid.

In another embodiment of the disclosed subject matter, there is a method for processing a bulk liquid comprising particles, the particles in the bulk liquid being at a first concentration, and the method comprising: providing a strainer surface with one or more openings disposed on a circumference thereof, the openings configured to allow an extracted liquid included in the bulk liquid to pass through the strainer surface while preventing particles from passing through the strainer surface, such that a concentration of particles in the extracted liquid is less than 10% of the first concentration; outputting the extracted liquid from an interior region of the rotating strainer surface; and rotating the strainer surface at a speed sufficient to generate a centrifugal force or turbulence at the openings sufficient to prevent the particles from clogging the openings, wherein the rotating and outputting are performed when the strainer surface is fully submerged in the bulk liquid.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the above background of the disclosed subject matter, brief summary of the disclosed subject matter, and detailed description of the disclosed subject matter, serve to explain the principles of the disclosed subject matter. Other features and advantages of the disclosed subject matter will become more apparent from this disclosure, which serves as a nonlimiting illustration of the disclosed subject matter.

DETAILED DESCRIPTION

The particular values and configurations discussed in these non-limiting examples can be varied and are cited merely to illustrate embodiments and are not intended to limit the scope of the disclosed subject matter.

Figure 1:
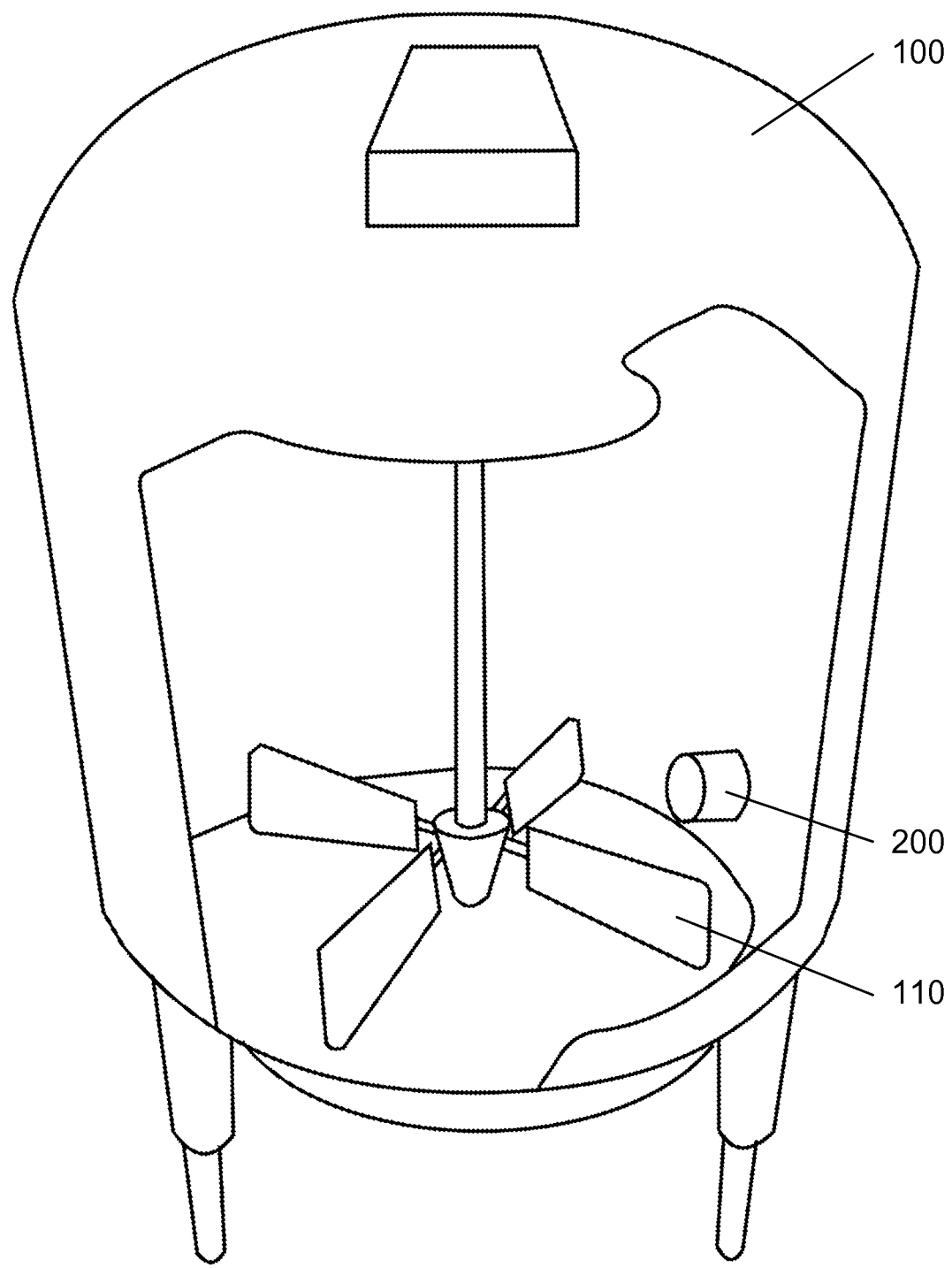
FIG. 1 illustrates a vessel 100 which includes a strainer 200 for separating a liquid from a bulk liquid containing particles stored within a liquid-bearing portion of vessel 100.
Figure 2:
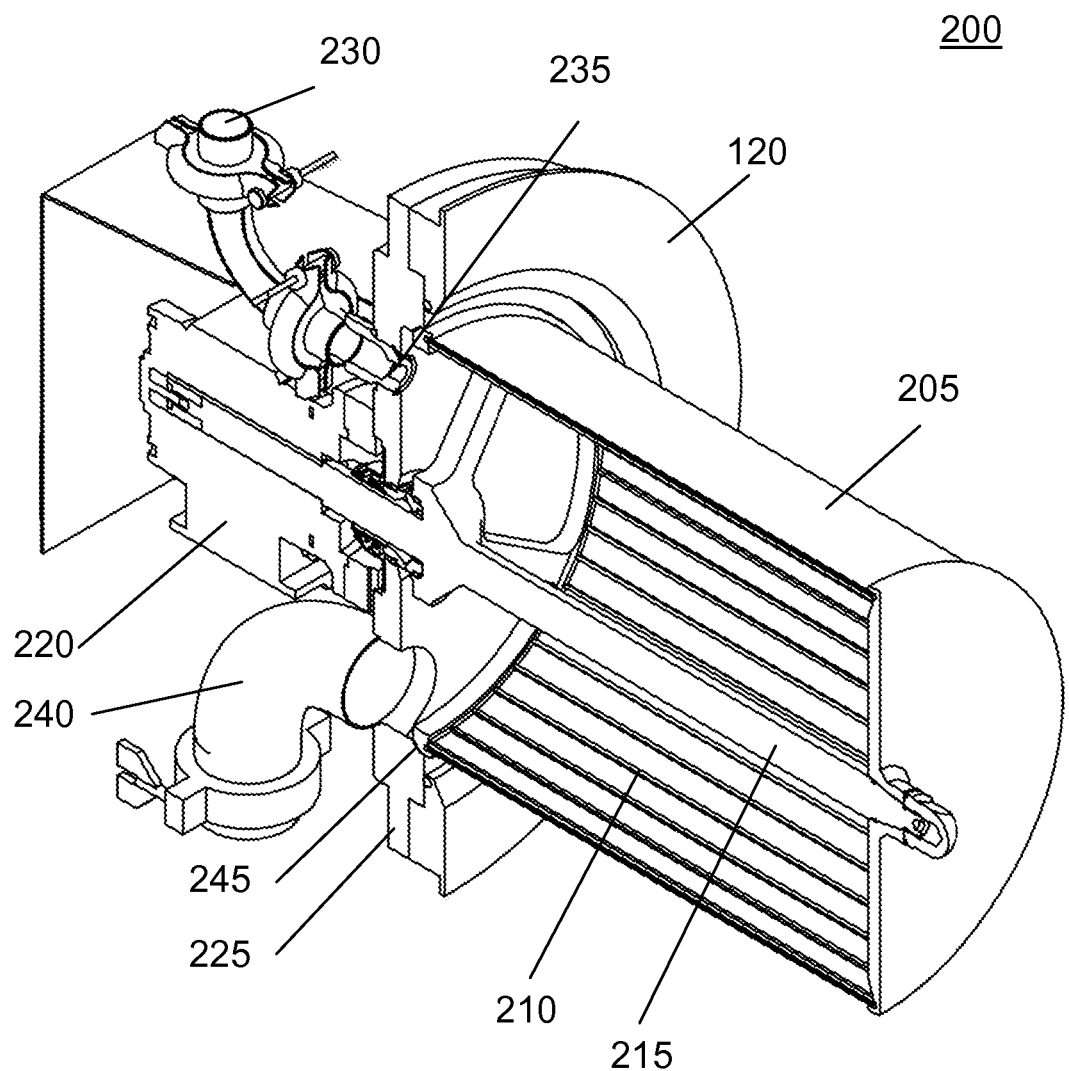
FIG. 2 illustrates a cross-sectional view of strainer 200.

FIG. 1 illustrates a vessel 100, such as the closed cheese vats discussed above, which includes strainer 200, which is illustrated in more detail in FIG. 2. Vessel 100 is configured to receive materials, whether liquid and/or solid, and store a bulk liquid containing particles (not illustrated) comprising a liquid component and a particulate component. Although FIG. 1 illustrates a vertical vessel, horizontal or other vessel configurations are also suitable.

Within a liquid-bearing portion of vessel 100 is agitator 110, which may be selectively rotated in order to stir the bulk liquid containing particles by rotation of agitator 110. In some embodiments, agitator 110 may be selectively rotated in either a clockwise or counterclockwise direction. In some embodiments, agitator 110 may be rotated at varying speeds. In some uses of the disclosed subject matter, particles included in the bulk liquid containing particles may settle out of the bulk liquid, and agitator 110 may be actuated in order to ensure the particles remain suspended or are again suspended in the bulk liquid. Although FIG. 1 illustrates an agitator 110 comprising 4 paddles at the lower portion of the liquid-bearing portion of vessel 100, many other agitator configurations are known to those of ordinary skill in the art. For example, U.S. Pat. No. 6,050,179, which is discussed above, describes use of a frame which serves to cut a cheese curd when rotated in a first direction, and stir the curd when rotated in an opposite direction. In some embodiments, pumping of the bulk liquid containing particles may be more appropriate for ensuring the particles are suspended in the bulk liquid, in which case pumps (not illustrated) may be used instead or, or in conjunction with, rotating agitator 110. In some embodiments, there may be multiple agitators included in vessel 100.

In some embodiments, vessel 100 may be configured to receive a plurality of materials which are mixed and/or reacted therein. As one example, in a cheese-making procedure a cheese milk and a coagulant may be combined in order to produce curd and whey. In some embodiments, vessel 100 may serve as a holding or processing vessel which receives from another processing unit a bulk liquid containing particles from which a liquid component is to be extracted using strainer 200.

As illustrated in FIG. 1, strainer 200 protrudes from a wall of vessel 100 into the liquid-bearing portion of vessel 100. In some embodiments, a wall of vessel 100 may protrude outward in order to position strainer 200 away from agitator 110. In some embodiments, more than one strainer 200 may be included in vessel 100 in order to increase the total straining capacity, or to provide strainers with different characteristics, such as different gap sizes, which may be used at different times during production cycle. Strainer 200 is positioned so as to be submerged, preferably entirely, within a liquid containing particles within the liquid-bearing portion of vessel 100 while rotating and performing liquid extraction. Although FIGS. 1 and 2 illustrate strainer 200 with a horizontal axis of rotation, strainer 200 may be in other orientations.

FIG. 2 illustrates a cross-sectional view of strainer 200 in more detail. Strainer 200 is mounted in wall 120 of vessel 100. As illustrated in FIG. 2, strainer 200 is inserted through a hole in wall 120, and base plate 225 of strainer 200 is removably attached to wall 120 using bolts or other fasteners. By being removably attached, strainer 200 may be more easily removed from vessel 100 for cleaning, inspection, maintenance, repair, or replacement.

Shaft 215, which is driven by motor 220, passes through base plate 225. Motor 220 may be configured to rotate shaft 215 in either direction, and at variable speed. Inside vessel 100, shaft 215 supports and rotates a cylindrical screen 205. Although FIG. 2 illustrates a cylindrical screen, other configurations, such as a cone or dome shape by way of example, may be used. Screen 205 is further supported by support rods 210, which extend parallel to shaft 215.

In some embodiments, screen 205 comprises a wedge wire mesh screen, in which one or more lengths of wire with a wedge-shaped cross section are wound around and attached to support rods 210. The wedge-shaped cross section is helpful in avoiding clogging of screen 205, although other cross sectional shapes may be used. Depending upon the properties of the liquid containing particles to be filtered by strainer 200, different wire diameters may be employed, and a gap between neighboring windings of the wedge wire may be varied. As an example, wedge wire mesh screens having a nominal gap size of 0.01 mm are readily available, with smaller gap sizes available depending upon the application and materials used. A gap size is selected such that most particles contained in the bulk liquid will not pass through the selected gap size, while an extracted liquid to be extracted from the bulk liquid does pass through the gap. An amount of particles present in the extracted liquid is affected by the gap size. A concentration of particles in the extracted liquid is less than in the bulk liquid. In some embodiments, a concentration of particles in the extracted liquid is less than 50% of a concentration of particles in the bulk liquid. In some embodiments, a concentration of particles in the extracted liquid is less than 25% of a concentration of particles in the bulk liquid. In some embodiments, a concentration of particles in the extracted liquid is less than 10% of a concentration of particles in the bulk liquid. In some embodiments, a concentration of particles in the extracted liquid is less than 5% of a concentration of particles in the bulk liquid. In some embodiments, a concentration of particles in the extracted liquid is less than 1% of a concentration of particles in the bulk liquid. Additionally, the overall length and diameter of screen 205 may also be varied. The length, diameter, and gap size for screen 205 each contribute to the flow rate capacity for strainer 200, and each may be varied to optimize flow characteristics for a particular application. The screen has been tested in a number of practical full scale experiments with gap sizes from 0.15 mm to 0.40 mm, lengths from 20 to 35 cm, a diameter of 20 cm, and maximum flow rate capacity of 22.5 L/h, exhibiting retention of cheese curd particles of more than 95% (i.e., the particulate concentration in the extracted liquid was less than 5% of the particulate concentration of the bulk fluid).

Figure 3:
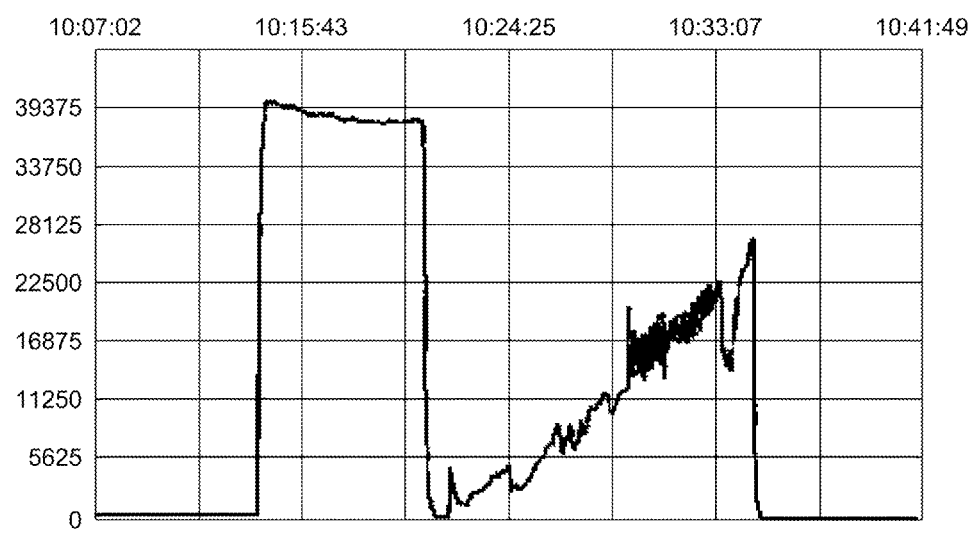
FIG. 3 shows experimental results observed with an embodiment of the disclosed subject matter.

FIG. 3 shows experimental results observed with an embodiment of the disclosed subject matter. Specifically, a test of anti clogging performance of an embodiment of the disclosed subject matter was performed on cheese whey. The test confirmed the anti clogging performance of the disclosed techniques, as when the strainer was rotating as prescribed, the strainer flow capacity was stable at approximately 39000 liters per hour, and when rotation of the strainer was stopped, the strainer flow capacity quickly dropped down to approximately 200 liters per hour, which is only 0.5% of the normal strainer flow capacity observed while rotating the strainer. The test results are summarized in the following table:

| Time of day (hour:minute) | Strainer status | Observed flow capacity (liters per hour) | Percent maximum flow |
| --- | --- | --- | --- |
| 10:15 | Rotating | 39400 | 100% |
| 10:17 | Rotating | 39210 | 99.5% |
| 10:20 | Rotating | 39025 | 99.0% |
| 10:21 | Stopped | 200 | 0.5% |
| 10:23 | Stopped | 200 | 0.5% |

Those skilled in the art will appreciate that other effective embodiments for screen 205 are known in the art, including, for example, a standard wire mesh comprising perpendicularly oriented rows and columns of wires, and a sheet of material with apertures arranged thereon for allowing liquid to pass through. The size of apertures may be adjusted to accommodate the properties of the liquid and particulate components of the bulk liquid being separated.

During separation of a liquid containing particles stored in vessel 100, during which time liquid from the liquid containing particles is filtered into the interior of strainer 200, screen 205 is rotated. This rotation creates sufficient turbulence and/or centrifugal force at the surface of screen 205 so as to prevent the gaps through which the extracted liquid passes from being clogged. As a result, a mechanical scraper device is not needed to prevent strainer 200 from becoming clogged. In some embodiments, such as the separation of curd and whey discussed above, screen 205 is rotated at a relatively low speed in order to minimize damage to the curd particles. In some cases, by increasing the surface area of screen 205, the pressure across screen 205 may be reduced, and consequently slower rates of rotation may be effective in preventing clogging of screen 205.

Upper tube 230 serves two primary functions. First, it is filled with liquid during operation of vessel 100 in order to prevent air from intruding into vessel 100. Second, upper tube 230 has a corresponding hole in base plate 225. In this hole is positioned a spray nozzle 235, which is used to flush and clean the interior of screen 205 between each batch produced in vessel 100. Spray nozzle 235 may be configured so as to spray the entire interior length of screen 205 and shaft 215, so as to require only a single spray nozzle 235. During flushing and cleaning of screen 205 with spray nozzle 235, motor 220 is operated so as to rotate screen 205 to ensure complete coverage and to provide centrifugal force to expel cleaning fluid. In this manner, strainer 200 is able to execute clean-in-place procedures which better ensure sanitary conditions in vessel 100 and more rapid turnaround time between batches.

The primary function of lower tube 240 is to provide an outward port for liquid filtered by screen 205. In some embodiments, there may be a pump (not illustrated), which may be used to increase the pressure by which the liquid is pulled through screen 205. In some embodiments, lower tube 240 may be operated so as to control a differential pressure across screen 205, in order to better reduce clogging of screen 205, reduce damage to particles in the bulk liquid, and control a flow rate of filtered liquid output through lower tube 240. In some uses of the disclosed strainer 200, the filtered liquid may be considered waste liquid. In other uses, the filtered liquid may be considered a useful product, and accordingly directed for further processing.

Reference numeral 245 illustrates a seal between the rotating portion of strainer 200 within vessel 100 and base plate 225. In some embodiments, rather than using a gasket or interlocking components in order to produce a tight seal, there is a gap. In one example, this gap is approximately 0.8 mm. Although such a gap may be larger than the particles in the liquid containing particles, when screen 205 is rotated the gap functions as a low flow pump as a result of centrifugal force, whereby a small portion of the liquid which has passed through screen 205 is pumped back into the liquid-bearing portion of vessel 100. With the flow in this gap running counter to the direction of the separating flow through screen 205, only a minimal quantity of particles pass through the gap while strainer 200 is being used for separation of the liquid containing particles. In some embodiments, this gap may be sealed in order to ensure particles from the liquid containing particles do not pass into the interior of strainer 200.

Strainer 200 can be installed in a batch process where a bulk liquid containing particles is filled into a vessel via a bulk liquid inflow port and a volume of liquid is extracted for further processing though the rotating strainer 200, leaving a concentrated bulk liquid with particles in the vessel which is output via a bulk liquid outflow port for further processing.

Also, strainer 200 be installed as part of a continuous process where a bulk liquid with a first concentration of particles is continuously supplied through an inflow port to strainer 200, liquid is extracted continuously from the bulk liquid though the rotating strainer 200 for further processing, allowing a remaining concentrated bulk liquid, with a second concentration of particles greater than the first concentration, to be removed through an outflow port by continuous flow from the process for further processing.

Although portions of the above description are made with reference to the production of cheese, and the separation of curd and whey produced during this process, the disclosed subject matter is not limited to this particular application. The disclosed subject matter may also be used for other foodmaking processes. For example, the disclosed subject matter can be used to extract milk or any milk-based product from a bulk milk or milk-based product containing particles originating from milk or any other source retaining the concentrated bulk milk or milk-based product with particles in the vessel or in a continuous downstream flow. As another example, the disclosed subject matter can be used to extract juices of fruit or vegetable origin or similar products from juices containing particles originating from fruits or vegetables or any other source retaining the concentrated juices with particles in the vessel or in the continuous downstream flow.

In another example, the disclosed subject matter can be used to extract liquids of animal origin e.g. waste water or blood from a liquid containing particles originating from animals or any other source retaining the concentrated liquid with particles in the vessel or in the continuous downstream out flow.

In another example, the disclosed subject matter can be used to extract liquid product or by product from a fermenter or bioreactor vessel containing a liquid product or by product with particles consisting of any chemically or biochemically active substances that is to be retained in the vessel or in the continuous downstream out flow such as microorganisms, catalysts, or a substance immobilized by a carrier matrix to obtain a certain minimum size.

In some embodiments, a processing device including strainer 200 is operated under the control of a programmed computer, according to a set of instructions for the computer. The computer controls a sequence of operations performed by the processing device, including, for example, filling vessel 100 with a bulk liquid including particles, rotation of screen 205, supplying filtered liquid for further processing, and supplying the remaining concentrated bulk liquid for further processing.

The claims, as originally presented and as they may be amended, encompass variations, alternatives, modifications, improvements, equivalents, and substantial equivalents of the embodiments and teachings disclosed herein, including those that are presently unforeseen or unappreciated.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

We claim:

1. A device for processing a bulk liquid comprising particles, the particles in the bulk liquid being at a first concentration, and the device comprising:
   a vessel having at least one wall;
   a rotating strainer surface disposed within said vessel that extends from and through said at least one wall, said rotating strainer surface having one or more openings disposed on a circumference thereof, the openings configured to allow an extracted liquid included in the bulk liquid to pass through the strainer surface while preventing particles from passing through the strainer surface, such that a concentration of particles in the extracted liquid is less than the first concentration;
   an extracted liquid outflow port which outputs the extracted liquid from an interior region of the rotating strainer surface; and
   a motor configured to rotate the strainer surface at a speed sufficient to generate a centrifugal force or turbulence at the openings sufficient to prevent the particles from clogging the openings, wherein
   the device is configured to rotate the strainer surface and output the extracted liquid through the extracted liquid outflow port when the strainer surface is fully submerged in the bulk liquid.

2. A device according to claim 1, further comprising
   a bulk liquid inflow port through which the bulk liquid is supplied into the vessel for storage in the vessel and extraction of the extracted liquid from the bulk liquid during such storage; and
   a concentrated bulk liquid outflow port which outputs the bulk liquid from the vessel for further processing after extraction of the extracted liquid from the bulk liquid.

3. The device according to claim 1, further comprising
   a bulk liquid inflow port through which the bulk liquid is continuously supplied to a region exterior to the rotating strainer surface; and
   a concentrated bulk liquid outflow port through which the bulk liquid, having a second concentration of particles greater than the first concentration, is continuously removed from the region exterior to the rotating strainer surface.

4. The strainer according to claim 1, wherein
   the particles comprise cheese curd; and
   the extracted liquid comprises whey.

5. The strainer according to claim 1, wherein
   the particles comprise particles originating from milk; and
   the extracted liquid comprises milk or a milk-based product.

6. The strainer according to claim 1, wherein
   the particles comprise particles originating from fruits or vegetables; and
   the extracted liquid comprises juices of fruit or vegetable origin.

7. The strainer according to claim 1, wherein
   the particles comprise particles originating from one or more animals; and
   the extracted liquid comprises water or blood.

8. The strainer according to claim 1, wherein
   the particles comprise particles comprising a chemically or biochemically active substance immobilized in a carrier matrix; and
   the extracted liquid comprises a liquid product or by product from a fermenter or bioreactor vessel.

9. A method for processing a bulk liquid comprising particles, the particles in the bulk liquid being at a first concentration, and the method comprising: providing a vessel having at least one wall; providing a strainer surface with one or more openings disposed within the vessel that extends from and through the at least one wall, the openings disposed on a circumference of the strainer surface and configured to allow an extracted liquid included in the bulk liquid to pass through the strainer surface while preventing particles from passing through the strainer surface, such that a concentration of particles in the extracted liquid is less than the first concentration; outputting the extracted liquid from an interior region of the rotating strainer surface; and rotating the strainer surface at a speed sufficient to generate a centrifugal force or turbulence at the openings sufficient to prevent the particles from clogging the openings, wherein the rotating and outputting are performed when the strainer surface is fully submerged in the bulk liquid.

10. The method according to claim 9, further comprising:
    storing the bulk liquid in a vessel with the strainer surface disposed therein; and
    outputting the bulk liquid from the vessel for further processing after extraction of the extracted liquid from the bulk liquid.

11. The method according to claim 9, further comprising:
    continuously supplying the bulk liquid to a region exterior to the strainer surface; and
    continuously removing from the region exterior to the rotating strainer surface the bulk liquid, having a second concentration of particles greater than the first concentration.

12. The method according to claim 9, wherein
    the particles comprise cheese curd; and
    the extracted liquid comprises whey.

13. The method according to claim 9, wherein
    the particles comprise particles originating from milk; and
    the extracted liquid comprises milk or a milk-based product.

14. The method according to claim 9, wherein
    the particles comprise particles originating from fruits or vegetables; and
    the extracted liquid comprises juices of fruit or vegetable origin.

15. The method according to claim 9, wherein
    the particles comprise particles originating from one or more animals; and
    the extracted liquid comprises water or blood.

16. The method according to claim 9, wherein
    the particles comprise particles comprising a chemically or biochemically active substance immobilized in a carrier matrix; and
    the extracted liquid comprises a liquid product or by product from a fermenter or bioreactor vessel.

* * * * *